US009864678B2

(12) United States Patent
Narasimhan et al.

(10) Patent No.: US 9,864,678 B2
(45) Date of Patent: *Jan. 9, 2018

(54) AUTOMATIC RISK ANALYSIS OF SOFTWARE

(71) Applicant: Microsoft Technology Licensing, LLC, Redmond, WA (US)

(72) Inventors: Vishwanath Narasimhan, Woodinville, WA (US); Anandha K. Ganesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,379

(22) Filed: Aug. 6, 2016

(65) Prior Publication Data

US 2016/0342503 A1 Nov. 24, 2016

Related U.S. Application Data

(63) Continuation of application No. 13/826,433, filed on Mar. 14, 2013, now Pat. No. 9,448,792.

(51) Int. Cl.
*G06F 9/45* (2006.01)
*G06F 11/36* (2006.01)
(Continued)

(52) U.S. Cl.
CPC ............ *G06F 11/3688* (2013.01); *G06F 8/70* (2013.01); *G06F 8/77* (2013.01); *G06F 11/008* (2013.01)

(58) Field of Classification Search
None
See application file for complete search history.

(56) References Cited

U.S. PATENT DOCUMENTS 4,558,413 A 12/1985 Schmidt et al.
5,481,722 A 1/1996 Skinner
(Continued)

OTHER PUBLICATIONS

"Application Quality in an Agile Testing Environment", Retrieved from: <<http://www.origsoft.com/solutions/agile-software-testing/>>, Jan. 16, 2013, 2 Pages.
(Continued)

*Primary Examiner* — Chuck Kendall
(74) *Attorney, Agent, or Firm* — Wade IP Law LLC

(57) ABSTRACT

Techniques are described herein that are capable of performing automatic risk analysis of software. An automatic risk analyzer may determine correlations between binaries of the software and source files of the software, between the source files and functions (i.e., sub-routines) of the software, between changes to source code of the software and defects, new features, and/or feature enhancements in the software, between attributes of the software (e.g., attributes associated with the changes to the source code), etc. at various time instances. The automatic risk analyzer may compare the correlations corresponding to a first time instance and the correlations corresponding to a second time instance to determine any of a variety of temporal relationships regarding underlying factors, including but not limited to new feature(s), feature enhancement(s), defect(s), churn rate, code coverage, code complexity, etc. The automatic risk analyzer may determine risk(s) for the software based on the temporal relationships.

20 Claims, 4 Drawing Sheets

(51) Int. Cl.
    *G06F 11/00*     (2006.01)
    *G06F 9/44*     (2006.01)

(56) References Cited

U.S. PATENT DOCUMENTS

| | | |
|---|---|---|
| 5,978,587 A | 11/1999 | Baisley et al. |
| 6,298,317 B1 | 10/2001 | Wiemann |
| 6,477,471 B1 | 11/2002 | Hedstrom et al. |
| 6,513,154 B1 | 1/2003 | Potterfield |
| 6,748,584 B1 | 6/2004 | Witchel et al. |
| 6,895,578 B1 | 5/2005 | Kolawa et al. |
| 7,028,290 B2 | 4/2006 | Srivastava et al. |
| 7,146,608 B1 | 12/2006 | Newman et al. |
| 7,222,138 B2 | 5/2007 | Fomenko |
| 7,296,261 B2 | 11/2007 | Witchel et al. |
| 7,334,219 B2 | 2/2008 | Cebula et al. |
| 7,401,322 B1 | 7/2008 | Shagam et al. |
| 7,496,904 B2 | 2/2009 | Srivastava et al. |
| 7,506,312 B1 | 3/2009 | Girolami-Rose et al. |
| 7,617,415 B1 | 11/2009 | Kadakia |
| 7,757,097 B2 | 7/2010 | Atallah et al. |
| 7,840,944 B2 | 11/2010 | Brunswig et al. |
| 8,166,464 B2 | 4/2012 | Lin et al. |
| 8,171,458 B2 | 5/2012 | Cheng et al. |
| 8,195,983 B2 | 6/2012 | Celeskey et al. |
| 8,225,302 B2 | 7/2012 | Waugh et al. |
| 8,271,961 B1 | 9/2012 | Chithambaram |
| 8,276,123 B1 | 9/2012 | Deng et al. |
| 8,307,351 B2 | 11/2012 | Weigert |
| 8,312,430 B2 | 11/2012 | Best et al. |
| 8,375,361 B2 | 2/2013 | Bell et al. |
| 8,387,018 B2 | 2/2013 | Artzi et al. |
| 8,453,117 B2 | 5/2013 | Rajan et al. |
| 8,479,161 B2 | 7/2013 | Weigert |
| 8,539,282 B1 | 9/2013 | Kabanov et al. |
| 8,572,093 B2 | 10/2013 | Weigert et al. |
| 8,713,532 B2 | 4/2014 | Gogh et al. |
| 9,448,792 B2 * | 9/2016 | Narasimhan .......... G06F 11/008 |
| 2003/0009740 A1 | 1/2003 | Lan |
| 2004/0044996 A1 | 3/2004 | Atallah |
| 2004/0221270 A1 | 11/2004 | Witchel et al. |
| 2004/0268308 A1 | 12/2004 | Srivastava et al. |
| 2005/0216882 A1 | 9/2005 | Sundararajan et al. |
| 2006/0190922 A1 | 8/2006 | Chen |
| 2007/0074149 A1 | 3/2007 | Ognev et al. |
| 2007/0226546 A1 | 9/2007 | Asthana et al. |
| 2007/0234293 A1 | 10/2007 | Noller et al. |
| 2008/0109790 A1 | 5/2008 | Farnham et al. |
| 2009/0089760 A1 | 4/2009 | Gill et al. |
| 2010/0185686 A1 | 7/2010 | Weigert et al. |
| 2010/0241469 A1 | 9/2010 | Weigert |
| 2010/0242028 A1 | 9/2010 | Weigert |
| 2011/0067005 A1 | 3/2011 | Bassin et al. |
| 2011/0161938 A1 | 6/2011 | Marum et al. |
| 2012/0110544 A1 | 5/2012 | Novak et al. |
| 2014/0053135 A1 | 2/2014 | Bird et al. |
| 2014/0281665 A1 | 9/2014 | Hey et al. |
| 2014/0282406 A1 | 9/2014 | Narasimhan et al. |
| 2014/0282459 A1 | 9/2014 | Hey et al. |

OTHER PUBLICATIONS

"MSF Risk Management Discipline v.1.1", In White Paper of Microsoft Solutions Framework, Jun. 2002, 54 Pages.

"Final Office Action Issued in U.S. Appl. No. 13/826,433", dated Jan. 16, 2015, 51 Pages.

"Non-Final Office Action Issued in U.S. Appl. No. 13/826,433", dated Oct. 30, 2015, 40 Pages.

"Non-Final Office Action Issued in U.S. Appl. No. 13/826,433", dated Jul. 28, 2014, 46 Pages.

"Notice of Allowance Issued in U.S. Appl. No. 13/826,433", dated Jun. 16, 2016, 12 Pages.

D'Ambros, et al. "An Extensive Comparison of Bug Prediction Approaches", In Proceedings of the 7th IEEE Working Conference on Mining Software Repositories, May 2, 2010, pp. 31-41.

Gokhale, et al. "A Time/Structure Based Software Reliability Model", In Proceedings of the Annals of Software Engineering, vol. 8, Issue 1, Jan. 1, 1999, pp. 85-121.

"International Preliminary Report on Patentability Issued in PCT Application No. PCT/US2014/021454", dated Feb. 3, 2015, 8 Pages.

"International Search Report and Written Opinion Issued in PCT Application No. PCT/US2014/021454", dated May 28, 2014, 12 Pages.

"Second Written Opinion Issued in PCT Application No. PCT/US2014/021454", dated Oct. 10, 2014, 7 Pages.

Talby, et al. "Agile Software Testing in a Large-Scale Project", In Journal of the IEEE Software, IEEE Computer Society, vol. 23, Issue 4, Jul. 2006, 8 Pages.

* cited by examiner

AUTOMATIC RISK ANALYSIS OF SOFTWARE

CROSS-REFERENCE TO RELATED APPLICATIONS

This application is a continuation of U.S. patent application Ser. No. 13/826,433, entitled "Automatic Risk Analysis of Software," filed Mar. 14, 2013, which is incorporated herein by reference in its entirety.

BACKGROUND

Testing of software often is performed concurrently with development of the software in an effort to improve quality of the software relatively early in the lifecycle of the software. However, defects in the software commonly are discovered in a development cycle that occurs after the development cycle in which the defect is introduced into the software. Identifying and analyzing the defect in such circumstance may be relatively challenging.

As the development of the software progresses from one cycle to another, tracing a defect to a particular development cycle may enable an evaluation and understanding of the quality of a feature in the software that is developed in a particular cycle. An inability to do so may introduce any of a variety of issues. For example, risk evaluation and course correction may become relatively difficult when the exact software code change that caused the defect is not known. It may become relatively difficult to divert resources for addressing the defect to the correct components of the software and/or the appropriate engineering teams. Feedback on the effectiveness of processes adopted for engineering teams may become relatively limited. Feedback on individuals and their teams based on certain patterns of defects may become relatively limited. Ongoing improvement in quality of the software may become less predictable as the Root Cause Analysis effort on existing defects becomes less effective if the exact code change that introduced the defect is not known.

Attempts have been made to manually address such issues. For instance, tracking tools, such as Visual Studio® Team Server (VSTS) or Product Studio™, rely on the effectiveness of a defect finder to link a defect to a software feature or software development cycle. The person filing the defect usually associates additional information with the defect, linking the defect to a previously released feature and/or a previous development cycle. Using this information, selective defects typically are analyzed in a triage or a separate exercise to create a manual report of defects that are linked to past development cycles. However, the person filing the defect likely is not the person who tested the software feature during the development cycle of the software. If the person filing the defect does not have the aforementioned information, that person may not be able to accurately link the defect to a product feature. Moreover, such manual techniques traditionally are not scalable, which may render such techniques relatively ineffective.

SUMMARY

Various approaches are described herein for, among other things, performing automatic risk analysis of software. For instance, such risk analysis may be automatically performed on the software during development of the software. The purpose of risk analysis is to determine risk(s) for a software program. A risk is a factor that is capable of negatively affecting execution of a software program.

An example method is described. In accordance with this method, a plurality of source code files of a software program are correlated to binaries that are included in a compiled representation of the software program to provide first correlations. For each time period of a plurality of time periods, change(s) that occur with respect to source code file(s) of the plurality of source code files during the respective time period are mapped to defect(s) in the compiled representation of the software program to provide defect mapping(s) based on the first correlations. Attribute(s) of the software program are determined. The attribute(s) include at least code coverage and/or code complexity. For each time period, intermediate relationship(s) between the defect mapping(s) for that time period and the attribute(s) are determined. The intermediate relationship(s) that correspond to a first time period are correlated to the intermediate relationship(s) that correspond to a second time period to provide temporal relationship(s). Likelihood(s) that respective subset(s) of a plurality of factors are to interfere with execution of the software program are determined based on the temporal relationship(s).

An example system is described that includes correlation logic, defect mapping logic, attribute determination logic, relationship logic, temporal analysis logic, and risk determination logic. The correlation logic is configured to correlate a plurality of source code files of a software program to binaries that are included in a compiled representation of the software program to provide first correlations. The defect mapping logic is configured to, for each time period of a plurality of time periods, mapping change(s) that occur with respect to source code file(s) of the plurality of source code files during the respective time period to defect(s) in the compiled representation of the software program to provide defect mapping(s) based on the first correlations. The attribute determination logic is configured to determine attribute(s) of the software program, the attribute(s) including at least code coverage and/or code complexity. The relationship logic is configured to, for each time period, determine intermediate relationship(s) between the defect mapping(s) for that time period and the attribute(s). The temporal analysis logic is configured to correlate the intermediate relationship(s) that correspond to a first time period to the intermediate relationship(s) that correspond to a second time period to provide temporal relationship(s). The risk determination logic is configured to determine likelihood(s) that respective subset(s) of a plurality of factors are to interfere with execution of the software program based on the temporal relationship(s).

A computer program product is described that includes a computer-readable medium having computer program logic recorded thereon for enabling a processor-based system to perform automatic risk analysis of a software program. The computer program product includes a first program logic module, a second program logic module, a third program logic module, a fourth program logic module, a fifth program logic module, and a sixth program logic module. The first program logic module is for enabling the processor-based system to correlate a plurality of source code files of a software program to binaries that are included in a compiled representation of the software program to provide first correlations. The second program logic module is for enabling the processor-based system to, for each time period of a plurality of time periods, mapping change(s) that occur with respect to source code file(s) of the plurality of source code files during the respective time period to defect(s) in the compiled representation of the software program to provide defect mapping(s) based on the first correlations. The third program logic module is for enabling the processor-based system to determine attribute(s) of the software program, the attribute(s) including at least code coverage and/or code complexity. The fourth program logic module is for enabling the processor-based system to, for each time period, determine intermediate relationship(s) between the defect mapping(s) for that time period and the attribute(s). The fifth program logic module is for enabling the processor-based system to correlate the intermediate relationship(s) that correspond to a first time period to the intermediate relationship(s) that correspond to a second time period to provide temporal relationship(s). The sixth program logic module is for enabling the processor-based system to determine likelihood(s) that respective subset(s) of a plurality of factors are to interfere with execution of the software program based on the temporal relationship(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
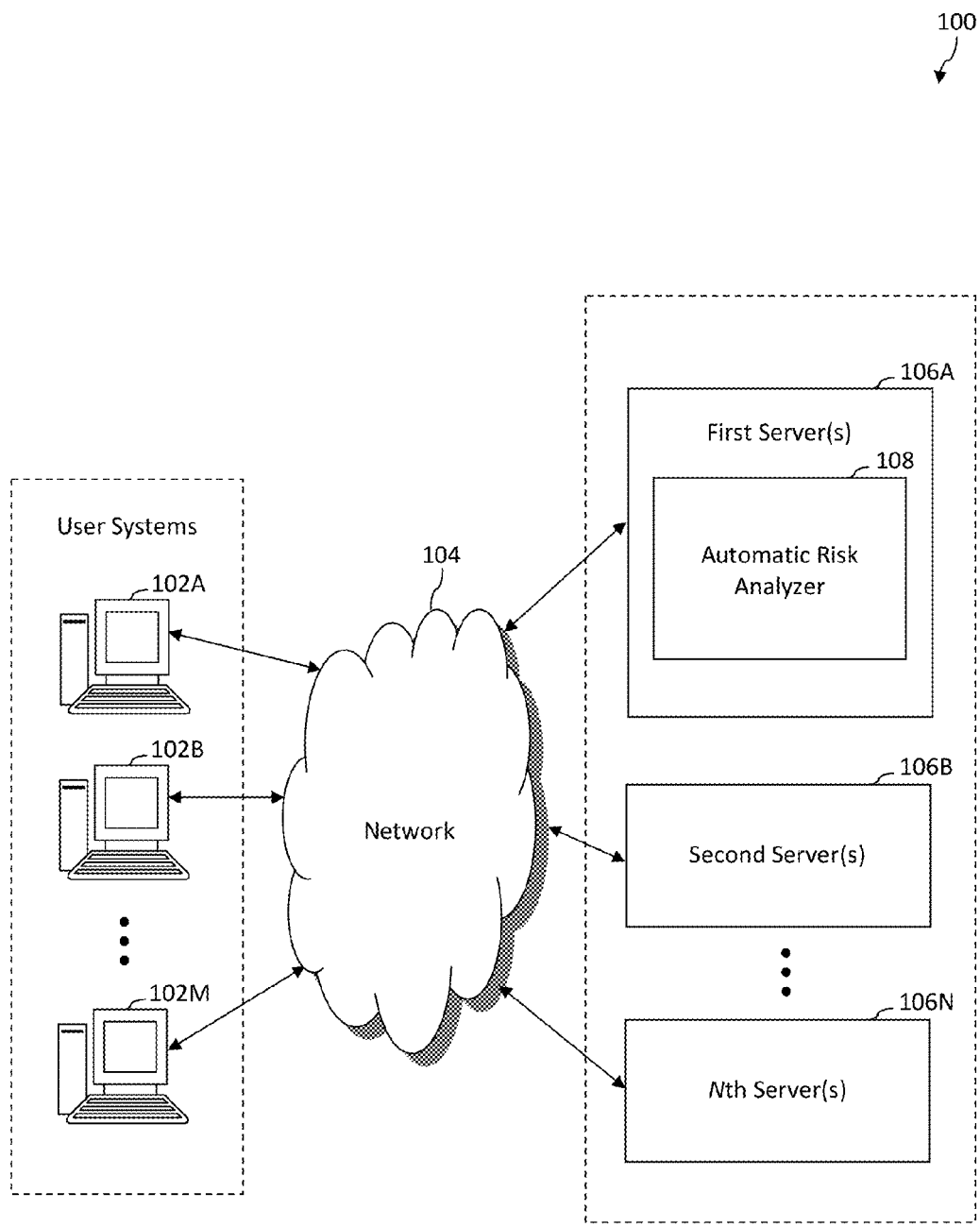
FIG. 1 is a block diagram of an example automatic risk analysis system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of performing automatic risk analysis of a software program. For instance, such risk analysis may be automatically performed on the software program during development of the software program. The purpose of risk analysis is to determine risk(s) for a software program. A risk is a factor that is capable of negatively affecting execution of a software program. Risk analysis involves multiple operations, all of which may be perform in parallel, all of which may be performed in series, or some of which may be performed in parallel and others of which may be performed in series.

For a software program under test, binaries of the software program and symbols for each of the sub-routines (a.k.a. functions) of the software program may be analyzed. A binary of the software program is a component of a compiled representation of the software program. The binaries may be correlated to source code files of the software program. The source code files may be correlated to the functions of the software program.

For any change that is made to the source code of the software program, the change may be analyzed and correlated to a list of defects that gets addressed by that change. A mapping may be maintained between specified source code changes and specified defects. The terms "correlation" and "mapping" are used interchangeably herein. If the change to the source code is related to new feature(s) of the software program and/or enhancement(s) to existing feature(s) of the software program, the change may be analyzed and correlated to a list of enhancements and/or additions addressed by that change. A mapping may be maintained between specified source code changes and specified enhancements and/or additions. The change to the source code may be analyzed for attributes, including but not limited to developer who makes the change, a date and/or a time at which the change was made, etc. Over a period of time, the aforementioned correlations may be iteratively improved. Relationships between various attributes (e.g., quality metrics) of the software program may be correlated using any of the correlations described herein and/or by mapping the correlations with other attributes.

Between two time periods, any of the aforementioned correlations may be used to re-analyze each change to the source code with each other change to collect information regarding any of a variety of correlations, including but not limited to a correlation of code enhancements to code defects (e.g., enhancement "abc" caused nine defects), a correlation of code defects to code defects (e.g., fixing defect "xyz" caused or introduced eleven other defects), a correlation of code defects to code churn (e.g., fixing defect "xyz" at a specified time is too risky in terms of code churn), a correlation of code coverage to code defect(s), a correlation of code coverage to code enhancement(s), a correlation of code complexity to code defect(s), a correlation of code complexity to code enhancement(s), etc. As used herein, "code churn" (a.k.a. churn rate) indicates a number of times that a function in the software program is changed during a designated period of time. "Code coverage" indicates an amount of the software program that is tested by one or more software tests. "Code complexity" indicates a number of paths that are included between a starting point of the software program and an ending point of the software program. It will be recognized that such re-analysis may be performed using filters based on process(es) followed during the software development life cycle of the software program.

Risk(s) for the software program may be determined based on observed correlation patterns, such as those discussed above.

Example techniques described herein have a variety of benefits as compared to conventional techniques for analyzing risk for a software program. For instance, the example techniques may be capable of automatically linking a defect in the software program to an original source code change that introduced the defect by analyzing input from a variety (e.g., all) of relevant components, including but not limited to a defect tracking tool (e.g., Product Studio™, Visual Studio® Team Server (VSTS), etc.), a source control system (e.g., Source Depo™, VSTS, etc.), and binaries and/or symbols of the software program. Such techniques may be performed on a continual basis, and the results may be kept available for any of the previous development cycle.

Determining a code change that introduces a defect into the software program may facilitate risk evaluation of the software program and course correction during development of the software program. Such determination may facilitate diversion of resources for addressing the defect to the correct components of the software program and/or the appropriate engineering teams. Such determination may facilitate provision of feedback regarding the effectiveness of processes adopted for engineering teams. Such determination may facilitate provision of feedback regarding individuals and their teams based on certain patterns of defects. Ongoing improvement in quality of the software program may be relatively more predictable using the example techniques. The example techniques may be substantially more scalable than conventional techniques.

FIG. 1 is a block diagram of an example automatic risk analysis system 100 in accordance with an embodiment. Generally speaking, automatic risk analysis system 100 operates to provide information to users (e.g., software engineers, application developers, etc.) in response to requests (e.g., hypertext transfer protocol (HTTP) requests) that are received from the users. The information may include documents (e.g., Web pages, images, video files, etc.), output of executables, and/or any other suitable type of information. In accordance with example embodiments described herein, automatic risk analysis system 100 performs automatic risk analysis of software. Detail regarding techniques for performing automatic risk analysis of software is provided in the following discussion.

As shown in FIG. 1, automatic risk analysis system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of automatic risk analysis system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). It will be recognized that the example techniques described herein may be implemented using a developer tool.

First server(s) 106A is shown to include an automatic risk analyzer 108 for illustrative purposes. Automatic risk analyzer 108 is configured to perform automatic risk analysis of software. For instance, such risk analysis may be automatically performed on the software during development of the software. For example, automatic risk analyzer 108 may determine correlations between binaries of the software and source files of the software, between the source files and functions (i.e., sub-routines) of the software, between changes to source code of the software and defects in the software, between the changes to source code and new features that are added to the software, between changes to the source code and enhancements to existing features of the software, between attributes of the software (e.g., attributes associated with the changes to the source code), etc. Such correlations may be determined at multiple time instances (e.g., at periodic intervals).

Automatic risk analyzer 108 may compare the correlations corresponding to a first time instance and the correlations corresponding to a second time instance to determine any of a variety of temporal relationships regarding underlying factors. Examples of an underlying factor include but are not limited to new feature(s) of the software, enhancement(s) to existing feature(s) of the software, defect(s) in the software, churn rate of a function in the software, code coverage of the software, code complexity of the software, etc.

Automatic risk analyzer 108 may determine risk(s) for the software based on the temporal relationships. Each risk may indicate a likelihood that one or more of the underlying factors are to interfere with execution of the software. For instance, each risk may indicate an extent to which the one or more underlying factors may interfere with the execution.

It will be recognized that automatic risk analyzer 108 may be (or may be included in) a developer tool, though the scope of the example embodiments is not limited in this respect. Example techniques for performing automatic risk analysis of software are discussed in greater detail below with reference to FIGS. 2 and 3.

Automatic risk analyzer 108 may be implemented in various ways to perform automatic risk analysis of software, including being implemented in hardware, software, firmware, or any combination thereof. For example, automatic risk analyzer 108 may be implemented as computer program code configured to be executed in one or more processors. In another example, automatic risk analyzer 108 may be implemented as hardware logic/electrical circuitry. In an embodiment, automatic risk analyzer 108 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Automatic risk analyzer 108 is shown to be incorporated in first server(s) 106A for illustrative purposes and is not intended to be limiting. It will be recognized that automatic risk analyzer 108 (or any portion(s) thereof) may be incorporated in any one or more of the user systems 102A-102M. For example, client-side aspects of automatic risk analyzer 108 may be incorporated in one or more of the user systems 102A-102M, and server-side aspects of automatic risk analyzer 108 may be incorporated in first server(s) 106A. In another example, automatic risk analyzer 108 may be distributed among the user systems 102A-102M. In yet another example, automatic risk analyzer 108 may be incorporated in a single one of the user systems 102A-102M. In another example, automatic risk analyzer 108 may be distributed among the server(s) 106A-106N. In still another example, automatic risk analyzer 108 may be incorporated in a single one of the server(s) 106A-106N.

Figure 2:
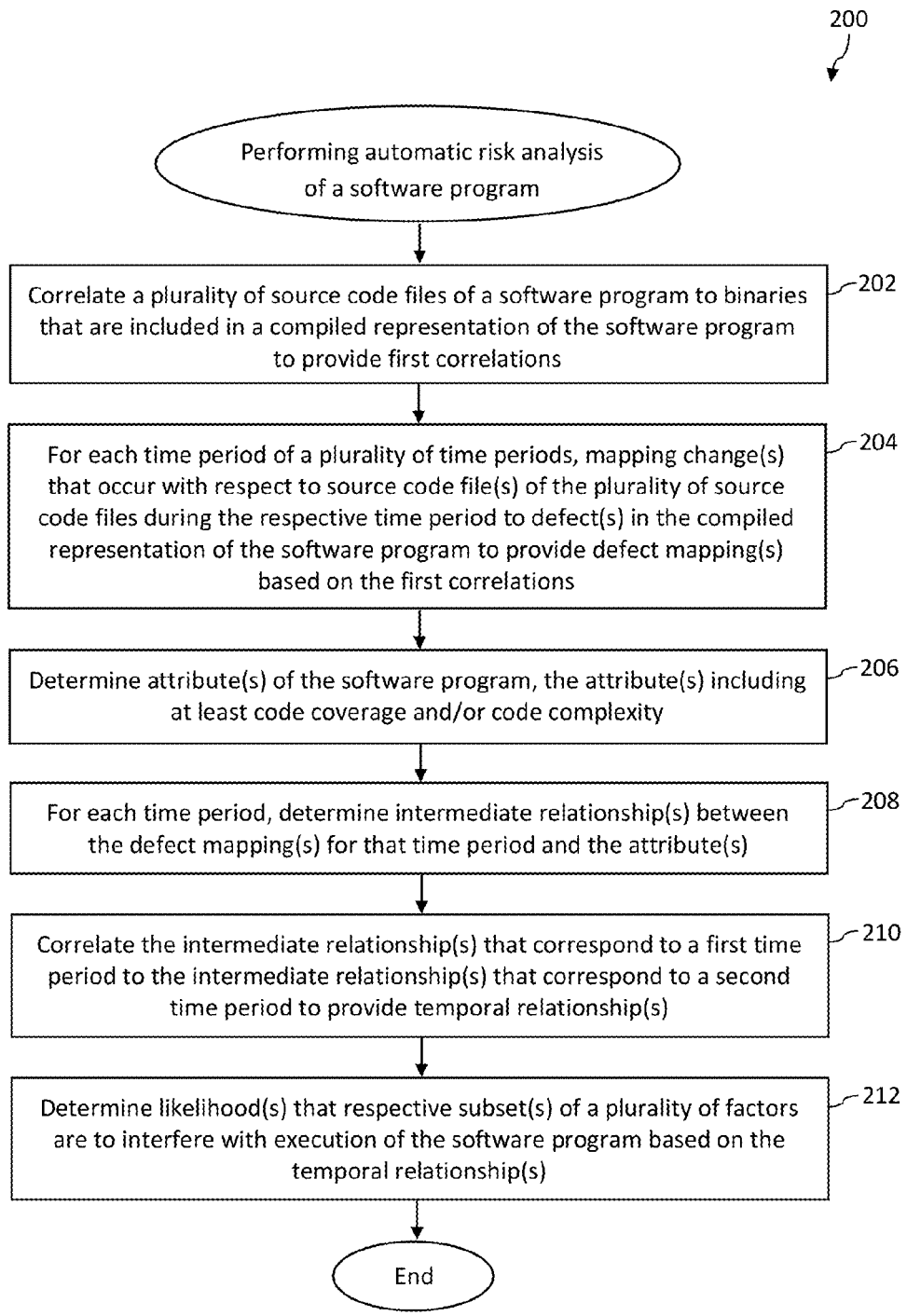
FIG. 2 depicts a flowchart of an example method for performing automatic risk analysis of a software program in accordance with an embodiment.
Figure 3:
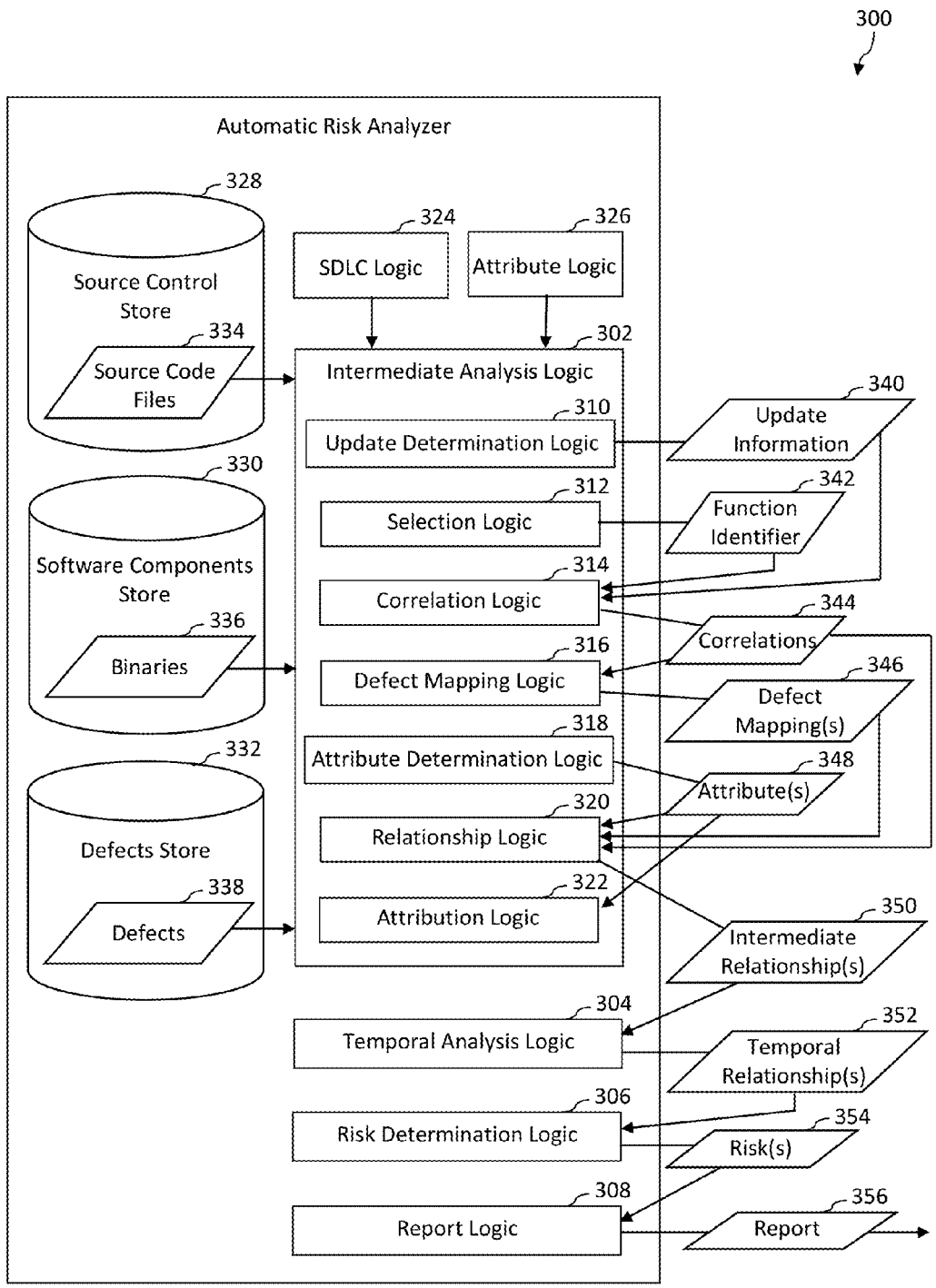
FIG. 3 is a block diagram of an example implementation of an automatic risk analyzer in accordance with an embodiment.

FIG. 2 depicts a flowchart 200 of an example method for performing automatic risk analysis of a software program in accordance with an embodiment. Flowchart 200 may be performed by automatic risk analyzer 108 shown in FIG. 1, for example. For illustrative purposes, flowchart 200 is described with respect to automatic risk analyzer 300 shown in FIG. 3, which is an example of automatic risk analyzer 108, according to an embodiment. As shown in FIG. 3, automatic risk analyzer 300 includes intermediate analysis logic 302, temporal analysis logic 304, risk determination logic 306, report logic 308, SDLC logic 324, attribute logic 326, source control store 328, software components store 330, and defects store 332. Intermediate analysis logic 302 includes update determination logic 310, selection logic 312, correlation logic 314, defect mapping logic 316, attribute determination logic 318, relationship logic 320, and attribution logic 322. Further structural and operational embodiments will be apparent to persons skilled in the relevant art(s) based on the discussion regarding flowchart 200.

As shown in FIG. 2, the method of flowchart 200 begins at step 202. In step 202, a plurality of source code files of a software program are correlated to binaries that are included in a compiled representation of the software program to provide first correlations. For example, the binaries may indicate a version of the software program. In accordance with this example, the plurality of source code files may be identified based on the version of the software program that is indicated by the binaries. In an example implementation, source control store 328 stores source code files 334 of the software program, and software components store 330 stores binaries 336 of the software program. In accordance with this implementation, correlation logic 314 correlates the source code files 334 to the binaries 336 to provide the first correlations, which are included in correlations 344.

At step 204, for each time period of a plurality of time periods, change(s) that occur with respect to source code file(s) of the plurality of source code files during the respective time period are mapped to defect(s) in the compiled representation of the software program to provide defect mapping(s) based on the first correlations. Examples of a change that may occur with respect to the source code file(s) include but are not limited to addition of a sub-routine to a source code file, deletion of a sub-routine from a source code file, replacement of a sub-routine in a source code file with another sub-routine, modification of a source code file (e.g., a sub-routine therein), etc. The defect mapping(s) may be provided in accordance with an extensible markup language (XML) schema, though the example embodiments are not limited in this respect.

In an example implementation, defects store 332 stores defects 338, which include information (e.g., metadata) regarding defect(s) in the software program. The information regarding the defect(s) may indicate portion(s) of the software program that include the respective defect(s), portion(s) (e.g., right panel, left panel, top panel, bottom panel, etc.) of a graphical representation that is generated by the software program that is affected by the defect(s), etc. Examples of a portion of the software program include but are not limited to a source code file of the software program, a sub-routine of the software program, a directory associated with the software program, a path map to a specified feature of the software program, etc. In accordance with this implementation, for each time period, defect mapping logic 316 maps change(s) that occur with respect to source code file(s), which are included in the source code files 334, during the respective time period to the defect(s) to provide defect mapping(s) 346 based on the first correlations.

At step 206, attribute(s) of the software program are determined. The attribute(s) include at least code coverage and/or code complexity. The code coverage indicates an amount of the software program that is tested by software test(s). The amount of the software program may be a proportion of the software program, a number of the functions (i.e., sub-routines) that are included in the software program, a proportion of the functions that are included in the software program, etc. The code complexity indicates a number of paths that are included between a starting point of the software program and an ending point of the software program. The code complexity may be directly related to a number of defects in the software program, though the scope of the example embodiments is not limited in this respect. It will be recognized that any two or more of steps 202, 204, and 206 may be performed in parallel.

In an example implementation, attribute determination logic 318 determines attribute(s) 348 of the software program. For example, attribute determination logic 318 may determine the attribute(s) 348 based on information regarding the attribute(s) 348 that is received from attribute logic 326. In accordance with this example, attribute logic 326 may analyze the software program to determine such information. Attribute logic 326 may store and/or generate such information for retrieval by attribute determination logic 318.

At step 208, for each time period, intermediate relationship(s) between the defect mapping(s) for that time period and the attribute(s) are determined. In an example implementation, relationship logic 320 receives the defect mapping(s) 346 from defect mapping logic 316 and the attribute(s) 348 from attribute determination logic 318. Defect mapping(s) 346 included the defect mapping(s), and the attribute(s) 348 include the attribute(s). In accordance with this implementation, for each time period, relationship logic 320 determines intermediate relationship(s) 350 between the defect mapping(s) for that time period and the attribute(s).

At step 210, the intermediate relationship(s) that correspond to a first time period are correlated to the intermediate relationship(s) that correspond to a second time period to provide temporal relationship(s). The first time period may correspond to a first version or release of the software program, and the second time period may correspond to a second version or release of the software program that is different from the first version or release, though the scope of the example embodiments is not limited in this respect. In an example implementation, temporal analysis logic 304 receives the intermediate relationship(s) 350 from relationship logic 320. In accordance with this implementation, temporal analysis logic 304 correlates a subset of the intermediate relationship(s) 350 that corresponds to the first time period to a subset of the intermediate relationship(s) 350 that corresponds to the second time period to provide temporal relationship(s) 352.

At step 212, likelihood(s) that respective subset(s) of a plurality of factors are to interfere with execution of the software program are determined based on the temporal relationship(s). In an example implementation, risk determination logic 306 receives the temporal relationship(s) 352 from temporal analysis logic 304. In accordance with this implementation, risk determination logic 306 determines the likelihood(s) that the respective subset(s) of the plurality of factors are to interfere with execution of the software program based on the temporal relationship(s) 352. For instance, risk determination logic 306 may identify subset(s) of the plurality of factors that are capable of negatively affecting execution of the software program as risk(s) 354. Risk(s) 354 may include information that indicates which of the plurality of factors have a relatively high likelihood of interfering with execution of the software program.

It will be recognized by persons skilled in the relevant art(s) that any one or more of the steps described above may be performed automatically. In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example embodiment, flowchart 200 includes generating a report that indicates that designated factor(s) of the plurality of factors are relatively likely to interfere with the execution of the software program based on designated likelihood(s) of the designated factor(s) to interfere with the execution reaching a threshold. In an example implementation, report logic 308 generates report 356, indicating that the designated factors are relatively likely to interfere with the execution of the software program. For instance, report logic 308 may generate the report 356 based on receipt of the risk(s) 354 from risk determination logic 306.

In one example, the report may indicate that the designated factor(s) have relatively high likelihood(s) to interfere with the execution and that factor(s) having likelihood(s) that do not reach the threshold have relative low likelihood(s) to interfere with the execution. In another example, the report may identify the designated factor(s) and may not identify factor(s) having likelihood(s) that do not reach the threshold (or a second threshold that is less than the aforementioned threshold).

To illustrate one suitable use of the report, assume that risk determination logic 306 determines that no test is configured to test a designated portion (e.g., sub-routine, line, etc.) of the software program. Not having a test that is configured to test the designated portion of the software program is one example of a risk for the software program. Further assume that the designated portion of the software program includes a defect. In this scenario, the report may recommend provisioning a test that is configured to test the designated portion of the software program based on the aforementioned determination.

In other scenarios, the report may indicate which developer(s) tend to write complex code, in which phase of development errors tend to occur, etc.

In another example embodiment, step 206 includes determining developer(s) who made the change(s) for specified time period(s) of the plurality of time periods. In accordance with this embodiment, flowchart 200 includes determining that at least one of the defect(s) is attributable to (e.g., caused by) a subset of the developer(s) based on a determination that, for at least one of the specified time period(s), at least one of the intermediate relationship(s) is between at least one of the defect mapping(s) and at least one developer in the subset of the developer(s). In an example implementation, attribution logic 322 determines that at least one of the defect(s) is attributable to the subset of the developer(s). For example, attribution logic 322 may determine that at least one of the defect(s) is attributable to the subset of the developer(s) based on receipt of the attribute(s) 348 from attribution determination logic 318. In accordance with this example, the attributes 348 may identify the developer(s) who made the change(s) for the specified time period(s).

In yet another example embodiment, step 206 includes determining time instance(s) at which the respective change(s) occurred. In accordance with this embodiment, flowchart 200 includes determining that at least one of the defect(s) is introduced in the software program at a specified time instance based on a determination that, for at least one of the plurality of time periods, at least one of the intermediate relationship(s) is between at least one of the defect mapping(s) and the specified time instance. In an example implementation, attribution logic 322 determines the time instance(s) at which the respective change(s) occurred. For example, attribution logic 322 may determine the time instance(s) at which the respective change(s) occurred based on receipt of the attribute(s) 348 from attribution determination logic 318. In accordance with this example, the attributes 348 may identify the time instance(s) at which the respective change(s) occurred.

In still another example embodiment, flowchart 200 includes correlating the source code files to a plurality of functions of the software program to provide second correlations. Each function of the plurality of functions corresponds to a respective sub-routine of the software program. In accordance with this embodiment, the defect mapping(s) that are provided at step 204 are further based on the second correlations. In an example implementation, correlation logic 314 correlates the source code files to the plurality of functions to provide the second correlations. Correlation logic 314 may include the second correlations in correlations 344. In accordance with this implementation, defect mapping logic 316 maps the change(s) for each time period to the defect(s) to provide the defect mapping(s) further based on the second correlations.

In an aspect of the aforementioned embodiment, step 206 may include determining a churn rate of each function of the plurality of functions. Each churn rate indicates a number of times that the respective function is changed during a designated period of time. In an example implementation, attribute determination logic 318 determines the churn rate of each function of the plurality of functions.

In another aspect of this embodiment, flowchart 200 may include selecting the plurality of functions from a corpus of functions of the software program. Selecting the plurality of functions in this manner may be referred to as filtering the corpus of functions. In accordance with this aspect, the corpus of functions includes the plurality of functions and at least one non-selected function. A non-selected function is a function that is not selected for inclusion in the plurality of functions. For example, one or more functions in the corpus of functions that is included in a beta version of the software program may not be included in a release version of the software program. In accordance with this example, performing automatic risk analysis with regard to the one or more functions may result in unnecessary consumption of resources and time. In further accordance with this aspect, correlating the plurality of source code files to the plurality of functions to provide the second correlations is performed in response to selecting the plurality of functions from the corpus of functions.

In an example implementation, selection logic 312 selects the plurality of functions from the corpus of functions. Selection logic 312 may generate a function identifier 342, which specifies the plurality of functions. In accordance with this implementation, correlation logic 314 correlates the plurality of source code files to the plurality of functions in response to receipt of the function identifier 342 from selection logic 312.

In another example embodiment, flowchart 200 includes determining that a specified change of the change(s) for the first time period relates to a specified new functionality that is being added to the software program. In accordance with this embodiment, flowchart 200 further includes correlating the specified change to one or more new functionalities that are addressed by the specified change to provide one or more respective second correlations. The one or more new functionalities include the specified new functionality. In further accordance with this embodiment, step 208 includes for the first time period, determining the intermediate relationship(s) between the defect mapping(s) for the first time period, the attribute(s), and the second correlation(s).

In an example implementation, update determination logic 310 determines that the specified change relates to the specified new functionality. Update determination logic 310 may generate update information 340, which indicates that the specified change relates to the specified new functionality. In accordance with this implementation, correlation logic 314 correlates the specified change to the one or more new functionalities that are addressed by the specified change to provide the one or more respective second correlations. For instance, correlation logic 314 may correlate the specified change to the one or more new functionalities that are addressed by the specified change based on receipt of the update information 340. In further accordance with this implementation, for the first time period, relationship logic 320 determines the intermediate relationship(s) between the defect mapping(s) for the first time period, the attribute(s), and the second correlation(s).

In yet another example embodiment, flowchart 200 includes determining that a specified change of the change(s) for the first time period relates to a specified enhancement to an existing functionality of the software program. In accordance with this embodiment, flowchart 200 further includes correlating the specified change to enhancement(s) that are addressed by the specified change to provide respective second correlation(s). The enhancement(s) include the specified enhancement. In further accordance with this embodiment, step 208 includes for the first time period, determining the intermediate relationship(s) between the defect mapping(s) for the first time period, the attribute(s), and the second correlation(s).

In an example implementation, update determination logic 310 determines that the specified change relates to a specified enhancement to an existing functionality of the software program. Update determination logic 310 may generate update information 340, which indicates that the specified change relates to the specified enhancement. In accordance with this implementation, correlation logic 314 correlates the specified change to the enhancement(s) that are addressed by the specified change to provide the respective second correlation(s). For instance, correlation logic 314 may correlate the specified change to the enhancement(s) that are addressed by the specified change based on receipt of the update information 340. In further accordance with this implementation, for the first time period, relationship logic 320 determines the intermediate relationship(s) between the defect mapping(s) for the first time period, the attribute(s), and the second correlation(s).

SDLC logic 324 generates systems development life cycle (SDLC) information regarding the software program. Such information may pertain to any suitable methodologies, including but not limited to "waterfall", "spiral", "Agile software development", "rapid prototyping", "incremental", and/or synchronize and stable". Intermediate analysis logic 302 is capable of processing SDLC information pertaining to any suitable combination of methodologies. For instance, intermediate analysis logic 302 is capable of processing information from disparate processes and data sources with the various correlations described herein to provide the intermediate relationship(s) 350 for further processing by temporal analysis logic 304.

It will be recognized that automatic risk analyzer 300 may not include one or more of intermediate analysis logic 302, temporal analysis logic 304, risk determination logic 306, report logic 308, update determination logic 310, selection logic 312, correlation logic 314, defect mapping logic 316, attribute determination logic 318, relationship logic 320, attribution logic 322, SDLC logic 324, attribute logic 326, source control store 328, software components store 330, and/or defects store 332. Furthermore, automatic risk analyzer 300 may include components in addition to or in lieu of intermediate analysis logic 302, temporal analysis logic 304, risk determination logic 306, report logic 308, update determination logic 310, selection logic 312, correlation logic 314, defect mapping logic 316, attribute determination logic 318, relationship logic 320, attribution logic 322, SDLC logic 324, attribute logic 326, source control store 328, software components store 330, and/or defects store 332.

Any one or more of user systems 102A-102M, any one or more of servers 106A-106N, automatic risk analyzer 108, intermediate analysis logic 302, temporal analysis logic 304, risk determination logic 306, report logic 308, update determination logic 310, selection logic 312, correlation logic 314, defect mapping logic 316, attribute determination logic 318, relationship logic 320, attribution logic 322, SDLC logic 324, attribute logic 326, source control store 328, software components store 330, defects store 332, and/or flowchart 200 may be implemented in hardware, software, firmware, or any combination thereof.

For example, any one or more of user systems 102A-102M, any one or more of servers 106A-106N, automatic risk analyzer 108, intermediate analysis logic 302, temporal analysis logic 304, risk determination logic 306, report logic 308, update determination logic 310, selection logic 312, correlation logic 314, defect mapping logic 316, attribute determination logic 318, relationship logic 320, attribution logic 322, SDLC logic 324, attribute logic 326, source control store 328, software components store 330, defects store 332, and/or flowchart 200 may be implemented as computer program code configured to be executed in one or more processors.

In another example, any one or more of user systems 102A-102M, any one or more of servers 106A-106N, automatic risk analyzer 108, intermediate analysis logic 302, temporal analysis logic 304, risk determination logic 306, report logic 308, update determination logic 310, selection logic 312, correlation logic 314, defect mapping logic 316, attribute determination logic 318, relationship logic 320, attribution logic 322, SDLC logic 324, attribute logic 326, source control store 328, software components store 330, defects store 332, and/or flowchart 200 may be implemented as hardware logic/electrical circuitry.

For instance, in an embodiment, one or more of user systems 102A-102M, one or more of servers 106A-106N, automatic risk analyzer 108, intermediate analysis logic 302, temporal analysis logic 304, risk determination logic 306, report logic 308, update determination logic 310, selection logic 312, correlation logic 314, defect mapping logic 316, attribute determination logic 318, relationship logic 320, attribution logic 322, SDLC logic 324, attribute logic 326, source control store 328, software components store 330, defects store 332, and/or flowchart 200 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 4:
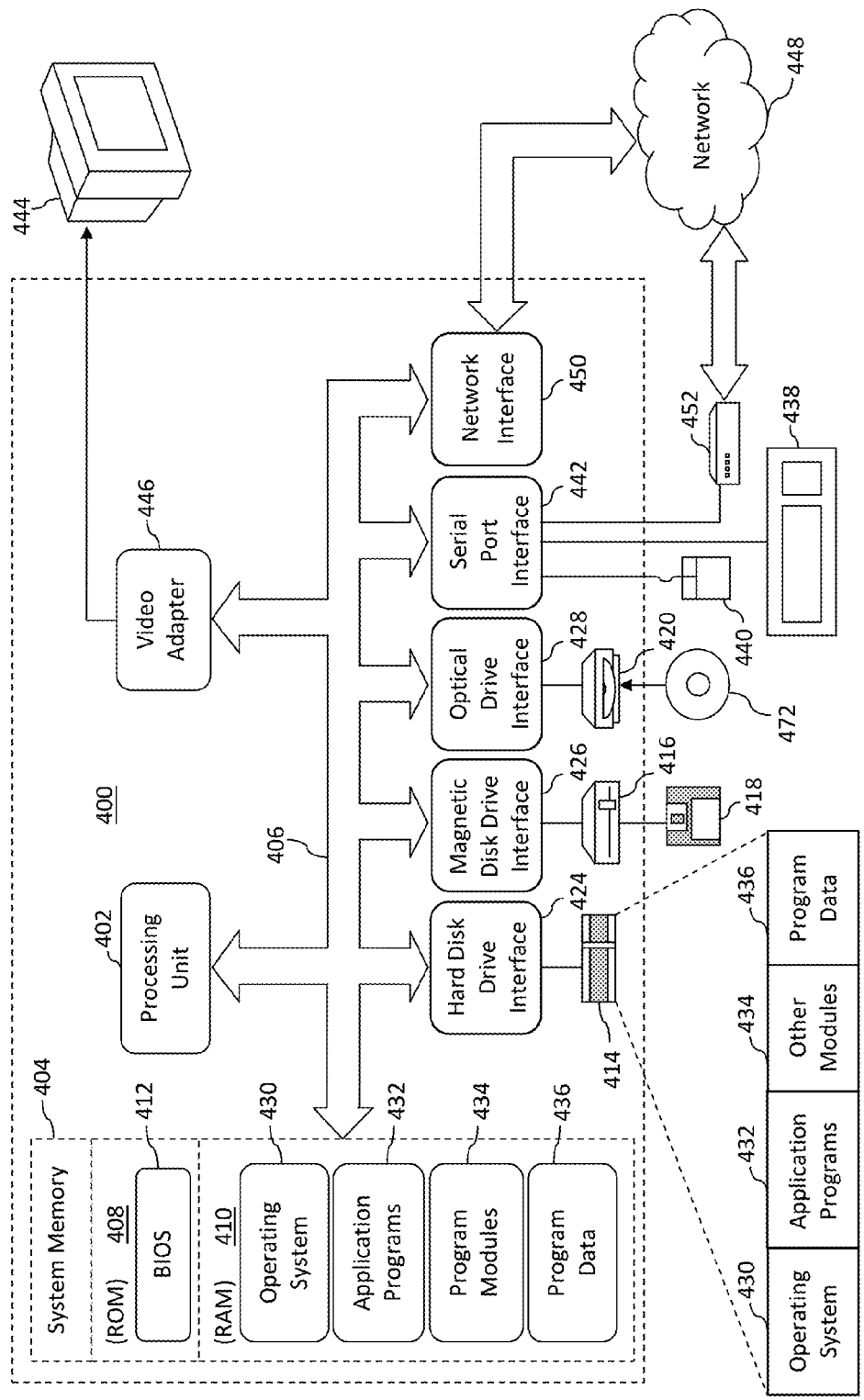
FIG. 4 depicts an example computer in which embodiments may be implemented.

FIG. 4 depicts an example computer 400 in which embodiments may be implemented. Any one or more of user systems 102A-102M and/or any one or more of file servers 106A-106N shown in FIG. 1 may be implemented using computer 400, including one or more features of computer 400 and/or alternative features. Computer 400 may be a general-purpose computing device in the form of a conventional personal computer, a mobile computer, or a workstation, for example, or computer 400 may be a special purpose computing device. The description of computer 400 provided herein is provided for purposes of illustration, and is not intended to be limiting. Embodiments may be implemented in further types of computer systems, as would be known to persons skilled in the relevant art(s).

As shown in FIG. 4, computer 400 includes a processing unit 402, a system memory 404, and a bus 406 that couples various system components including system memory 404 to processing unit 402. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

Computer 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 422 such as a CD ROM, DVD ROM, or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 430, one or more application programs 432, other program modules 434, and program data 436. Application programs 432 or program modules 434 may include, for example, computer program logic for implementing any one or more of automatic risk analyzer 108, intermediate analysis logic 302, temporal analysis logic 304, risk determination logic 306, report logic 308, update determination logic 310, selection logic 312, correlation logic 314, defect mapping logic 316, attribute determination logic 318, relationship logic 320, attribution logic 322, SDLC logic 324, attribute logic 326, source control store 328, software components store 330, defects store 332, and/or flowchart 200 (including any step of flowchart 200), as described herein.

A user may enter commands and information into the computer 400 through input devices such as keyboard 438 and pointing device 440. Other input devices (not shown) may include a microphone, joystick, game pad, satellite dish, scanner, touch screen, camera, accelerometer, gyroscope, or the like. These and other input devices are often connected to the processing unit 402 through a serial port interface 442 that is coupled to bus 406, but may be connected by other interfaces, such as a parallel port, game port, or a universal serial bus (USB).

A display device 444 (e.g., a monitor) is also connected to bus 406 via an interface, such as a video adapter 446. In addition to display device 444, computer 400 may include other peripheral output devices (not shown) such as speakers and printers.

Computer 400 is connected to a network 448 (e.g., the Internet) through a network interface or adapter 450, a modem 452, or other means for establishing communications over the network. Modem 452, which may be internal or external, is connected to bus 406 via serial port interface 442.

As used herein, the terms "computer program medium," "computer-readable medium," and "computer-readable storage medium" are used to generally refer to media such as the hard disk associated with hard disk drive 414, removable magnetic disk 418, removable optical disk 422, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 432 and other program modules 434) may be stored on the hard disk, magnetic disk, optical disk, ROM, or RAM. Such computer programs may also be received via network interface 450 or serial port interface 442. Such computer programs, when executed or loaded by an application, enable computer 400 to implement features of embodiments discussed herein. Accordingly, such computer programs represent controllers of the computer 400.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method performed using at least one processor of a processor-based system, the method comprising:
correlating a plurality of source code files of a software program to a plurality of binaries that are included in a compiled representation of the software program to provide a plurality of first correlations;
for each time period of a plurality of time periods, mapping one or more changes that occur with respect to one or more source code files of the plurality of source code files during the respective time period to one or more portions of the compiled representation of the software program that represent at least one risk for the software program during execution to provide one or more mappings based at least in part on the plurality of first correlations;
determining one or more attributes of the software program;
for each time period of the plurality of time periods, determining one or more intermediate relationships between the one or more mappings for that time period and the one or more attributes;
correlating the one or more intermediate relationships that correspond to a first time period of the plurality of time periods to the one or more intermediate relationships that correspond to a second time period of the plurality of time periods to provide one or more temporal relationships; and
determining one or more likelihoods that one or more respective subsets of a plurality of factors are to interfere with execution of the software program based at least in part on the one or more temporal relationships.

2. The method of claim 1, wherein mapping the one or more changes for each time period comprises:
for each time period of the plurality of time periods, mapping the one or more changes to the one or more portions to provide the one or more mappings in accordance with an extensible markup language (XML) schema.

3. The method of claim 1, wherein determining the one or more attributes comprises:
determining one or more developers who made the one or more changes for one or more specified time periods of the plurality of time periods; and
wherein the method further comprises:
determining that at least one of the one or more portions is attributable to a subset of the one or more developers based at least in part on a determination that, for at least one of the one or more specified time periods, at least one of the one or more intermediate relationships is between at least one of the one or more mappings and at least one developer in the subset of the one or more developers.

4. The method of claim 1, wherein determining the one or more attributes comprises:
determining one or more time instances at which the one or more respective changes occurred; and
wherein the method further comprises:
determining that at least one of the one or more portions is introduced in the software program at a specified time instance of the one or more time instances based at least in part on a determination that, for at least one of the plurality of time periods, at least one of the one or more intermediate relationships is between at least one of the one or more mappings and the specified time instance.

5. The method of claim 1, further comprising:
correlating the plurality of source code files to a plurality of functions of the software program to provide a plurality of second correlations, each function corresponding to a respective sub-routine of the software program;
wherein mapping the one or more changes for each time period comprises:
mapping the one or more changes for each time period to the one or more portions to provide the one or more mappings further based at least in part on the plurality of second correlations.

6. The method of claim 1, wherein determining the one or more attributes comprises:
determining code coverage, the code coverage indicating an amount of the software program that is tested by one or more software tests.

7. The method of claim 1, wherein determining the one or more attributes comprises:
determining code complexity, the code complexity indicating a number of paths that are included between a starting point of the software program and an ending point of the software program.

8. A system comprising:
memory; and
one or more processors coupled to the memory and configured to:
correlate a plurality of source code files of a software program to a plurality of binaries that are included in a compiled representation of the software program to provide a plurality of first correlations;
for each time period of a plurality of time periods, map one or more changes that occur with respect to one or more source code files of the plurality of source code files during the respective time period to one or more portions of the compiled representation of the software program that represent at least one risk for the software program during execution to provide one or more mappings based at least in part on the plurality of first correlations;
determine one or more attributes of the software program;
for each time period of the plurality of time periods, determine one or more intermediate relationships between the one or more mappings for that time period and the one or more attributes;
correlate the one or more intermediate relationships that correspond to a first time period of the plurality of time periods to the one or more intermediate relationships that correspond to a second time period of the plurality of time periods to provide one or more temporal relationships; and
determine one or more likelihoods that one or more respective subsets of a plurality of factors are to interfere with execution of the software program based at least in part on the one or more temporal relationships.

9. The system of claim 8, wherein the one or more processors are configured to, for each time period of the plurality of time periods, map the one or more changes to the one or more portions to provide the one or more mappings in accordance with an extensible markup language (XML) schema.

10. The system of claim 8, wherein a subset of the one or more attributes identifies one or more developers who made the one or more changes for one or more specified time periods of the plurality of time periods; and
wherein the one or more processors are configured to determine whether at least one of the one or more portions is attributable to a subset of the one or more developers based at least in part on whether, for at least one of the one or more specified time periods, at least one of the one or more intermediate relationships is between at least one of the one or more mappings and at least one developer in the subset of the one or more developers.

11. The system of claim 8, wherein a subset of the one or more attributes identifies one or more time instances at which the one or more respective changes occurred; and
wherein the one or more processors are configured to determine whether at least one of the one or more portions is introduced in the software program at a specified time instance of the one or more time instances based at least in part on whether, for at least one of the plurality of time periods, at least one of the one or more intermediate relationships is between at least one of the one or more mappings and the specified time instance.

12. The system of claim 8, wherein the one or more processors are configured to:
correlate the plurality of source code files to a plurality of functions of the software program to provide a plurality of second correlations, each function corresponding to a respective sub-routine of the software program; and
map the one or more changes for each time period to the one or more portions to provide the one or more mappings further based at least in part on the plurality of second correlations.

13. The system of claim 8, wherein the one or more attributes include code coverage, the code coverage indicating an amount of the software program that is tested by one or more software tests.

14. The system of claim 8, wherein the one or more attributes include code complexity, the code complexity indicating a number of paths that are included between a starting point of the software program and an ending point of the software program.

15. A computer program product comprising a computer-readable storage device having computer program logic recorded thereon for enabling a processor-based system to perform automatic risk analysis of a software program, the computer program product comprising:
a first program logic module for enabling the processor-based system to correlate a plurality of source code files of the software program to a plurality of binaries that are included in a compiled representation of the software program to provide a plurality of correlations;
a second program logic module for enabling the processor-based system to, for each time period of a plurality of time periods, map one or more changes that occur with respect to one or more source code files of the plurality of source code files during the respective time period to one or more portions of the compiled representation of the software program that represent at least one risk for the software program during execution to provide one or more mappings based at least in part on the plurality of correlations;
a third program logic module for enabling the processor-based system to determine one or more attributes of the software program;

a fourth program logic module for enabling the processor-based system to, for each time period of the plurality of time periods, determine one or more intermediate relationships between the one or more mappings for that time period and the one or more attributes;

a fifth program logic module for enabling the processor-based system to correlate the one or more intermediate relationships that correspond to a first time period of the plurality of time periods to the one or more intermediate relationships that correspond to a second time period of the plurality of time periods to provide one or more temporal relationships; and a sixth program logic module for enabling the processor-based system to determine one or more likelihoods that one or more respective subsets of a plurality of factors are to interfere with execution of the software program based at least in part on the one or more temporal relationships.

16. The computer program product of claim 15, wherein the second program logic module comprises:

logic for enabling the processor-based system to, for each time period of the plurality of time periods, map the one or more changes to the one or more portions of the compiled representation of the software program to provide the one or more mappings in accordance with an extensible markup language (XML) schema.

17. The computer program product of claim 15, wherein a subset of the one or more attributes identifies one or more developers who made the one or more changes for one or more specified time periods of the plurality of time periods; and wherein the computer program product further comprises:
a seventh program logic module for enabling the processor-based system to determines whether at least one of the one or more portions is attributable to a subset of the one or more developers based at least in part on whether, for at least one of the one or more specified time periods, at least one of the one or more intermediate relationships is between at least one of the one or more mappings and at least one developer in the subset of the one or more developers.

18. The computer program product of claim 15, wherein a subset of the one or more attributes identifies one or more time instances at which the one or more respective changes occurred; and wherein the computer program product further comprises:
a seventh program logic module for enabling the processor-based system to determine whether at least one of the one or more portions is introduced in the software program at a specified time instance of the one or more time instances based at least in part on whether, for at least one of the plurality of time periods, at least one of the one or more intermediate relationships is between at least one of the one or more mappings and the specified time instance.

19. The computer program product of claim 15, wherein the first program logic module comprises:

logic for enabling the processor-based system to correlate the plurality of source code files to a plurality of functions of the software program to provide a plurality of second correlations, each function corresponding to a respective sub-routine of the software program; and wherein the second program logic module comprises:
logic for enabling the processor-based system to map the one or more changes for each time period to the one or more portions to provide the one or more mappings further based at least in part on the plurality of second correlations.

20. The computer program product of claim 15, wherein the one or more attributes include at least one of (a) a churn rate of each function of a plurality of functions of the software program, (b) code coverage, or (c) code complexity;

wherein each churn rate indicates a number of times that the respective function is changed during a designated period of time;

wherein the code coverage indicates an amount of the software program that is tested by one or more software tests; and wherein the code complexity indicates a number of paths that are included between a starting point of the software program and an ending point of the software program.

* * * * *